United States Patent [19]
Kondo et al.

[11] 4,022,514
[45] May 10, 1977

[54] ANTI-SKID BRAKE CONTROL SYSTEM

[75] Inventors: Toshiyuki Kondo; Takashi Nagashima, both of Toyota, Japan

[73] Assignee: Aisin Seiki Kabushiki Kaisha, Kariya, Japan

[22] Filed: Dec. 9, 1975

[21] Appl. No.: 639,032

[30] Foreign Application Priority Data

| Dec. 19, 1974 | Japan | 49-146090 |
|---|---|---|
| Dec. 20, 1974 | Japan | 49-147214 |
| Dec. 27, 1974 | Japan | 50-3952 |
| May 14, 1975 | Japan | 50-57651 |

[52] U.S. Cl. .................... 303/115; 303/117; 303/119
[51] Int. Cl.² .................... B60T 8/00; B60T 13/68
[58] Field of Search .................... 303/115, 117, 119

[56] References Cited
UNITED STATES PATENTS

| 3,544,171 | 12/1970 | Lester | 303/117 |
|---|---|---|---|
| 3,605,813 | 9/1971 | Nakano | 303/115 |
| 3,724,915 | 4/1973 | MacDuff | 303/115 |
| 3,941,427 | 3/1976 | Harries | 303/115 |

*Primary Examiner*—Trygve M. Blix
*Assistant Examiner*—Reinhard J. Eisenzopf
*Attorney, Agent, or Firm*—Sughrue, Rothwell, Mion, Zinn & Macpeak

[57] ABSTRACT

An anti-skid brake control system especially adapted for a wheeled vehicle which has at least two independent brake circuits, comprising a single anti-skid actuator interposed between the two brake circuits and a computer electrically connected to the actuator for actuating the same by generating a signal in response to the respective brake circuits. The simple actuator is actuated to selectively control the pressure in the two brake circuits in order to obviate a wheel locking condition. The computer is programmed such that by only one actuator the pressure in the two brake circuits may be selectively and yet alternatively controlled.

14 Claims, 10 Drawing Figures

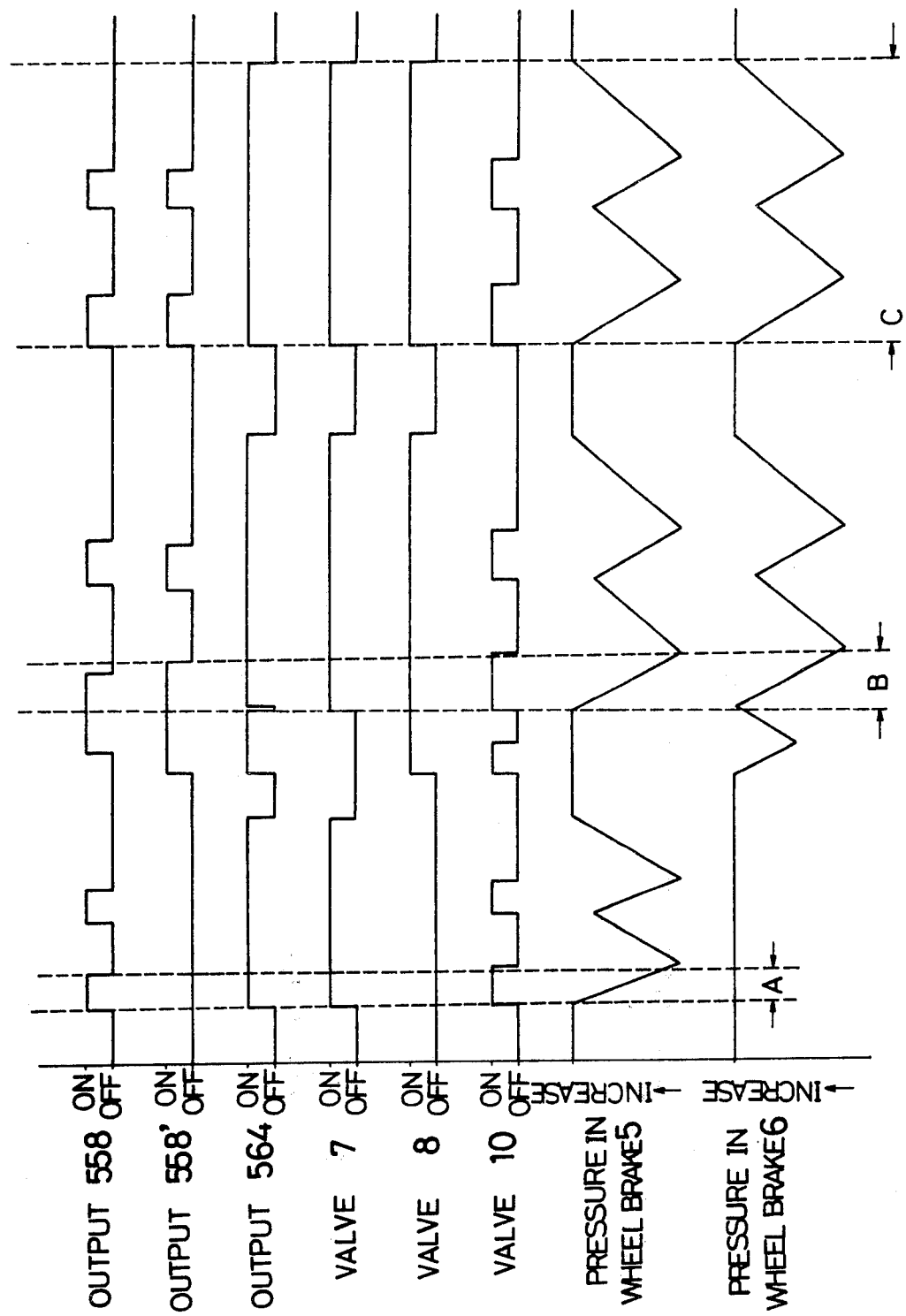

4,022,514

ANTI-SKID BRAKE CONTROL SYSTEM

BACKGROUND OF THE INVENTION

1. Field of the Invention

This invention relates generally to anti-skid brake control systems for vehicles and more particularly to an anti-skid brake control system adapted for a vehicle having two or more independent fluid brake circuits with only one pressure reducing chamber and piston.

2. Description of Prior Art

In the prior art, such as, for example, U.S. Pat. No. 3,544,171 granted on Dec. 1, 1970, two independent fluid brake circuits (10, 11, 16a, 15a, 13a, 9a; 10, 11, 16b, 15b, 9b) are provided and each circuit has an anti-skid actuator 7a, 7b for independently actuating each brake circuit. Each of the actuators 7a, 7b comprises a brake fluid pressure control unit 18 which is actuated by an hydraulic servo 19 (column 4, lines 26–29 thereof).

This type of system, however, has serious drawbacks, one being that since the two actuators are provided within the respective brake circuits, the system itself is so complicated and large that an increase in cost is not avoidable. Another drawback is that once an anti-skid situation occurs, a considerable amount of fluid is necessary at one time, so that there might occur a lack of brake pressure when both actuators are actuated simultaneously.

Another prior art system, such as that disclosed in U.S. Pat. No 3,674,317 granted on July 4, 1972, includes two brake circuits (14, 18, 18'; 16, 26, 26') and a single anti-skid control unit 22. In this prior art system, however, the wheels (20, 20'; 28, 28') of both circuits are controlled by the single actuator 22, and therefore, the size of the actuator 22 must be sufficiently large so as to effectively control the pressurized fluid in the four wheel brake means 18, 18'; 26, 26'. In this case, a modulator valve assembly 30 is disposed within one (16, 26, 26') of the circuits so as to assist the pressure reducing operation in the wheel brake means 26, 26' in addition to the single actuator 22. Macduff, U.S. Pat. No. 3,724,915, is cited as being of interest and includes separate brake circuits with one servo notch, however it uses two separate pressure reducing chambers.

SUMMARY OF THE INVENTION

It is, therefore, an object of the present invention to provide an improved anti-skid brake control system where a single anti-skid actuator is provided between two independent brake circuits for controlling the pressure in either one of the two circuits when the corresponding wheel and/or another wheel of the other circuit are being locked.

It is another object of the present invention to provide an improved anti-skid brake control system wherein the single anti-skid actuator is actuated to control the pressure in one of the brake circuits, the wheel of which first falls into an impending locking condition or a locked condition so as to be capable of normal steering operation under such anti-skid operation.

It is a further object of the instant invention to provide an improved anti-skid brake control system wherein the single anti-skid actuator is actuated to control the pressure in one of the brake circuits, the wheel of which later falls into an impending locking or a locked condition so as to effectively and safely perform the brake operation.

It is a still further object of the present invention to provide an improved anti-skid brake control system wherein the single anti-skid actuator is actuated to selectively and alternatively control the pressures in both brake circuits so as to shorten the brake stopping distance under such anti-skid operation.

BRIEF DESCRIPTION OF THE DRAWINGS

FIG. 8 is an explanatory view of the operation of the major elements of the circuit in FIG. 7.

DETAILED DESCRIPTION OF THE PREFERRED EMBODIMENT

Figure 1:
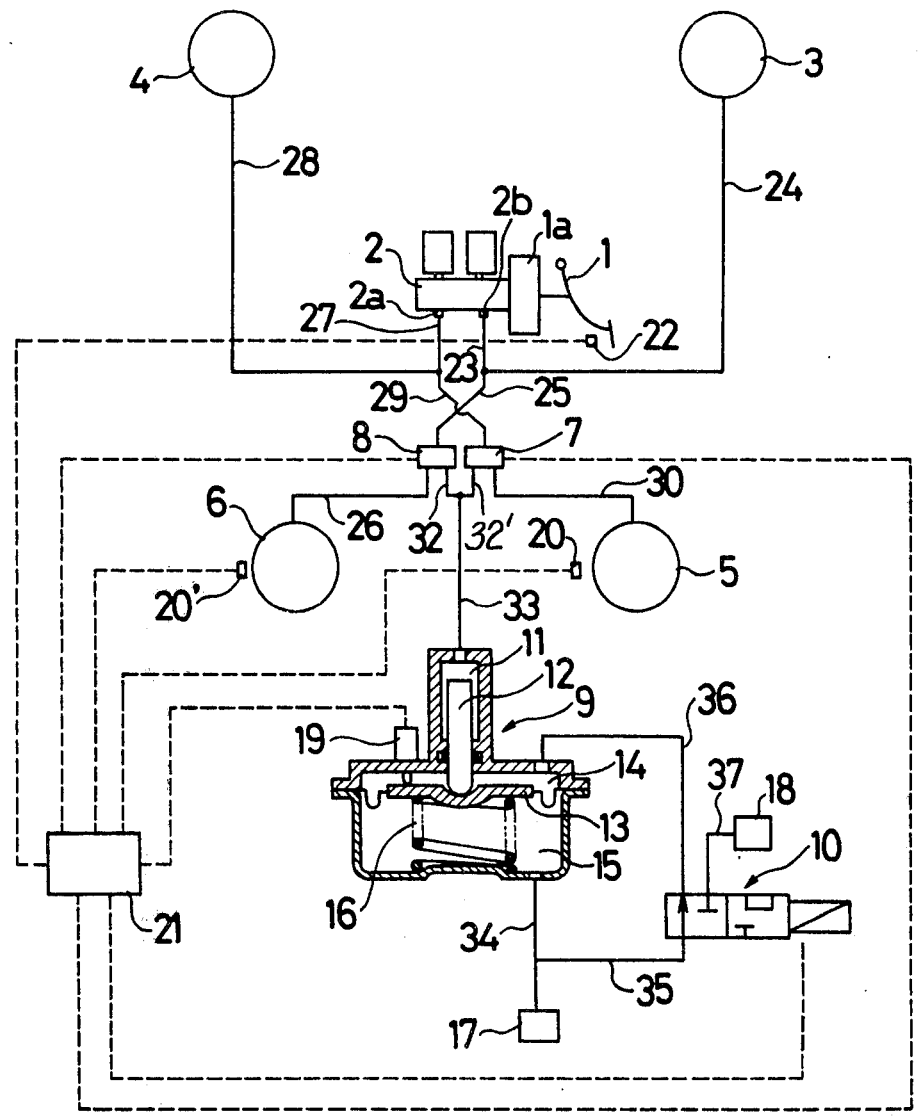
FIG. 1 is a system diagram of one embodiment of the anti-skid brake control system according to the present invention.

Numeral 1 designates a brake pedal which is operatively connected with a tandem master cylinder 2 through a booster 1a. Wheel brakes 3, 4, 5 and 6 are attached to right-front, left-front, right-rear, and left-rear wheels, respectively. The wheel brakes 3 and 6 are fluidically connected with each other through conduits 24, 25 and 26, while the wheel brakes 4 and 5 are fluidically connected with each other through conduits 28, 29, and 30. The master cylinder 2 is connected with the separated wheel brakes on one hand through port 2b and conduit 23 and the other hand through port 2a and conduit 27.

Two valves 7 and 8 are disposed between the conduits 29 and 30 and between the conduits 25 and 26, respectively. Such valves are illustrated in detail in FIG. 2 and will be explained later.

A pressure reducing device generally designated by numeral 9 is fluidically connected to the valves 7 and 8 through conduits 33, 32' and 32, respectively, to control valve 10 through circuit 36. The pressure reducing device 9 includes a pressure reducing chamber 11 and a pressure reducing piston 12 reciprocable within the reducing chamber 11 for decreasing or restoring the pressure therein.

The pressure reducing piston 12 is, at its lower end, engaged with a power piston 13 disposed between two servo chambers 14 and 15. Normally the power piston 13 is biased upwardly (toward the servo chamber 14) by the biasing force of a spring 16 provided in the servo chamber 15 as shown in FIG. 1. The servo chamber 14 is connected to the control valve 10 through the conduit 36, while the servo chamber 15 is connected to a vacuum source 17 through a circuit 34 and is additionally connected to the control valve 10 through a conduit 35.

The control valve 10 is connected to an atmospheric pressure source 18 through a conduit 37 while being electrically connected to a computer 21 as will be discussed later.

A switch 19 is attached to the pressure reducing device 9 and is electrically connected with the computer 21. The switch 19 is shown in the OFF condition in FIG. 1 and is placed in the ON condition by downward movement of the power piston 13.

The wheel brake means 5 and 6 are attached to sensor means 20 and 20', respectively, which detect a wheel locking or incipient locking condition of the individual wheels and generate signals which are sent to the computer 21. The computer 21 is also electrically connected with the valves 7 and 8. The two valves 7 and 8 are of similar construction and one, for example the valve 8, will be explained hereinafter.

Figure 2:
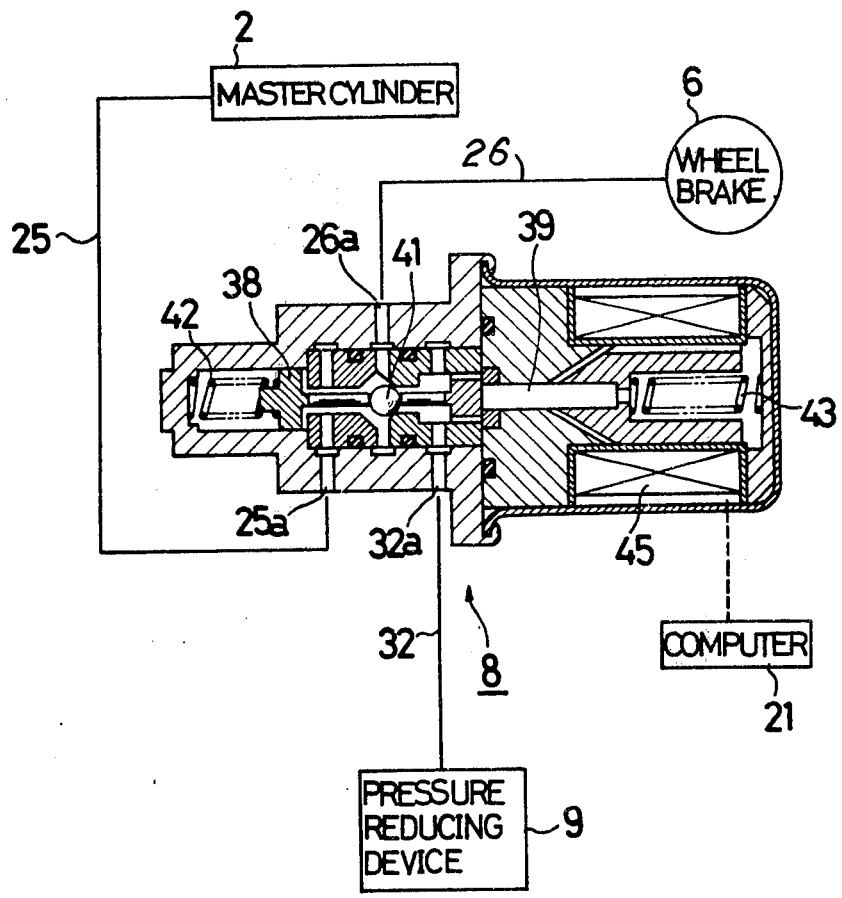
FIG. 2 is a cross-sectional view of the valve 8 of FIG. 1.

Valve 8, as indicated in FIG. 2, has a port 25a connected to the master cylinder 2 through the conduit 25, a port 26a connected to the wheel brake 6 through the conduit 26, and a port 32a connected to the pressure reducing device 9 through the conduit 32. A ball valve 41 is disposed between a valve retainer 38 and a plunger 39 normally closing the communication between the ports 26a and 32a through the biasing force of a spring 42 and opening the communication between the ports 25a and 26a.

The plunger 39 is operatively connected with a solenoid coil 45, and upon energization of the coil 45 the plunger 39 and therefore the ball 41 are moved to the left, overcoming the biasing force of the spring 42, to close the communication between the ports 25a and 26a and to open the communication between the ports 26a and 32a.

In summing up the so-called anti-skid brake operation according to FIGS. 1 and 2, when the brake pedal 1 is depressed, the hydraulic pressure is transmitted from the master cylinder 2 to the respective wheel brakes 3, 4, 5, and 6 through the conduits 23 and 27. The hydraulic pressure in the conduit 23 is transmitted to the wheel brake means 3 and 6 while the pressure in the conduit 27 is transmitted to the wheel brake means 4 and 5. The valves 7 and 8, in this instance, maintain the condition shown in FIG. 2 (i.e., close the fluid communication between the master cylinder 2 and the pressure reducing device 9) so that the wheel brakes 3–6 may receive a desired fluid pressure in response to the depression force of the brake pedal 1.

Next, under such normal braking operation, when one of the wheels, for example, the left-rear wheel 6 is subjected to excessive deceleration as to bring it into a state where sliding or locking is imminent, the solenoid coil 45 of the valve 8 is energized to interrupt the communication between the conduits 25 and 26 and allow communication between the conduit 26 and the conduit 32.

Thus, as can more clearly be seen in FIG. 1, the fluid pressure in the master cylinder 2 through the conduit 25 is now transmitted to the pressure reducing chamber 11 of the pressure reducing device 9 instead of being transmitted to the wheel brake 6 through the conduit 26. Here, the control valve 10 is actuated in response to a signal generated by the computer 21, as will be described later, to disconnect the conduit 36 from the conduit 35 and to connect it to conduit 37 (which is connected with the atmospheric pressure source 18).

Such actuation of the control valve 10 causes the pressure difference between the two chambers 14 and 15 of the pressure reducing device 9 to move the power piston 13 downwardly. The reducing piston 12, accordingly moves downwardly to decrease the pressure in the reducing chamber 11 as well as the pressure in the wheel brake 6 by increasing the capacity of the reducing chamber 11.

Thus the braking pressure in the wheel brake cylinder 6 will be decreased to prevent that wheel from a locking condition.

The object of the present invention resides in the fact that in a dual braking circuit of the vehicle, one wheel of the one circuit and the other wheel of the other circuit may be selectively and independently controlled to prevent their locking conditions.

Figure 3:
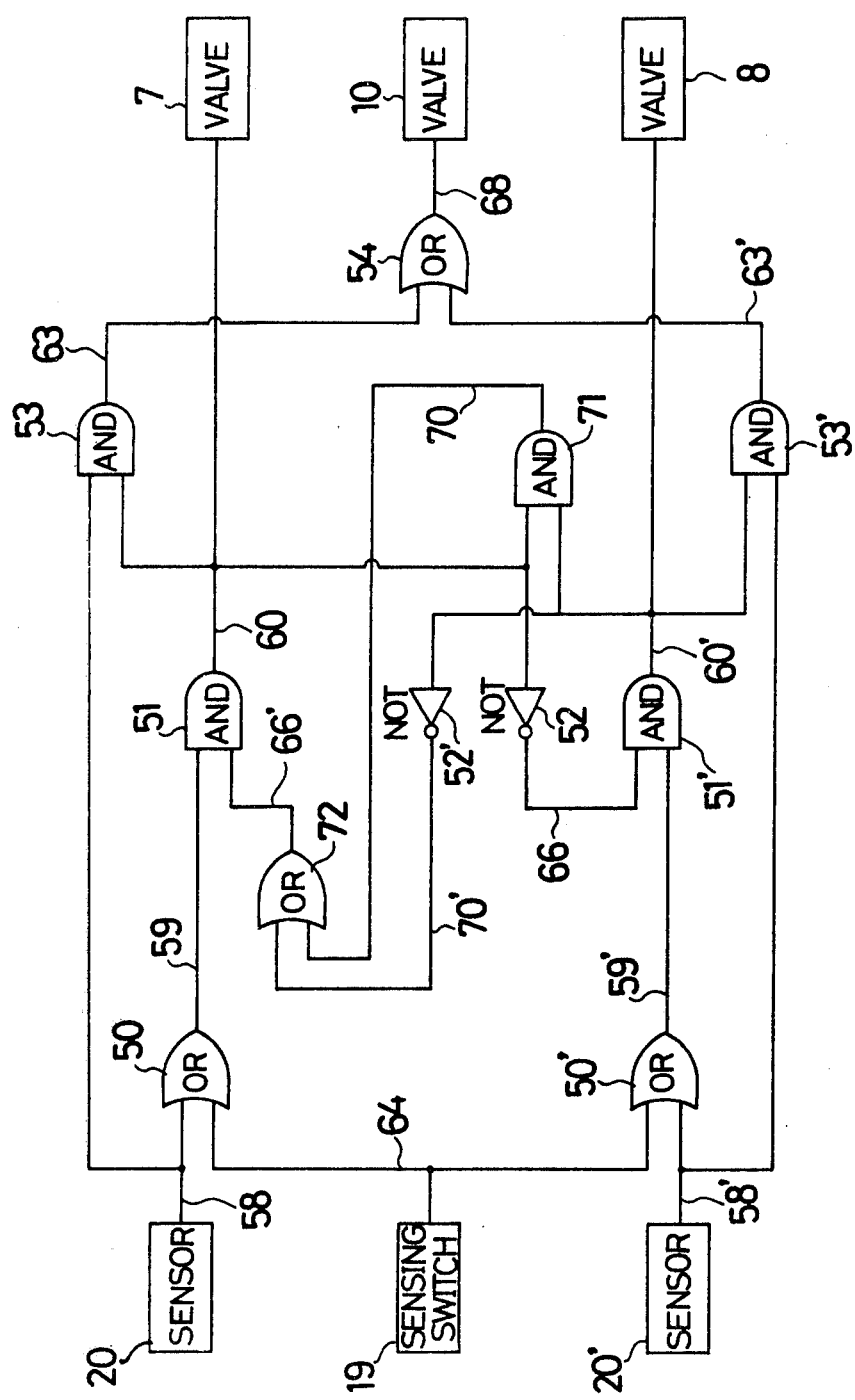
FIG. 3 is a circuit diagram of the computer means 21 of FIG. 1.

FIG. 3 illustrates the logic circuit of the computer 21, wherein a wheel which first incurs a locking condition will be controlled exclusively and where another wheel of another braking circuit falls in a locking condition during such anti-skid operation in the first wheel, the latter wheel cannot be controlled.

In the illustrated various logic elements, the OR-logic element generates an ON-signal when either one of the input signals is present; the AND-logic element generates an ON-signal only when all of the inputs are present; and the NOT-logic element generates an inverted output signal of the input signal.

Referring now to FIG. 3, an output 58 of the sensor 20 is an input of OR-logic element 50. The output 59 of the OR-logic element 50 is operated as an input of an AND-logic element 51. The output 60 of AND-logic element 51 is a control input to the valve 7. The output 58 of the sensor 20 also operates as an input to the AND-logic element 53.

The output 63 of element 53 is an input of OR-logic element 54. The output 68 thereof is the control input of the control valve 10. An output 64 of the sensing switch 19 on one hand operates as another input to the OR-logic element 50 and on the other hand operates as input of a similar OR-logic element 50'. Output 58' of the sensor 20' operates as another input of the OR-logic element 50' and also operates as an input of the AND-logic element 53'. The output 59' of OR-logic element 50' operates as an input to the AND-logic element 51'. The output 60' thereof is the control input for the valve 8 as well as an input for the AND-logic element 53'. The output 60' also operates as an input to the AND-logic element 71 and as an input for NOT-logic element 52'. The output 70' of the NOT-logic element 52' is an input of OR-logic element 72 and the output 70 of the AND-logic element 71 is input of the OR-logic element 72.

The output 66' of the OR-logic element 72 operates as another input of the AND-logic element 51. The output 60 thereof is further operated as another input of the AND-logic element 53 and is another input of the AND-logic element 71. The output 60 of the AND-logic element 51 is still further operated as an input of a NOT-logic element 52. The output 66 thereof operates as input of the AND-logic element 51'. The output 63' of the AND-logic element 53' also operates as another input to the OR-logic element 54.

In order to facilitate the explanation, output signals 58 and 58' from the respective sensors 20 and 20', respectively, are defined as ON when they detect a locking condition of their respective wheels and OFF when they detect the normal rotational condition thereof. As previously described, the switch 19 turns ON when the power piston 13 moves downward and turns OFF as shown in FIG. 1. The three valves 7, 10 and 8 are actuated when the respective input signals turn ON.

Under the normal braking (or running) condition of the vehicle, all the outputs 58, 64, 58' maintain OFF-conditions, and only the inverted output signals 66 and 70' of the NOT-logic elements 52 and 52' turn ON. Since the ON-output signal 70' from the NOT-logic element 52' is the one input of the OR-logic element 72, the output 66' thereof will also turn ON.

In this condition, when one sensor, for example, sensor 20, senses a locking condition of its wheel, then the output 58 turns ON. Due to the ON-output signal of the sensor 20, the output 59 of the OR-logic element 50 turns ON. Therefore, since both inputs of the AND-logic element 51 turn ON (one input being fed from the OR-logic element 50 and the other being fed from the OR-logic element 72), the output 60 turns On which is directly fed to the input of the valve 7 thereby actuating the same.

This ON signal is further fed to one input of the AND-logic element 53. Since the other input thereof is the ON-signal from the sensor 20, the output of the element 53 turns ON and is fed to one input of the OR-logic element 54 which is accordingly turned ON, activating the control valve 10.

Under this condition, since the other sensor 20' does not generate an ON-signal and the output 66 of the NOT-logic element 52 turns OFF due to the ON-output signal 60 from the AND-logic element 51, both inputs of the AND-logic element 51' turn OFF to maintain the output 60' thereof to OFF condition. Thus the valve 8 still maintains a non-actuated position as shown in FIG. 2.

Due to the actuation of the control valve 10, the power piston 13 moves downward (in FIG. 2) to turn the switch 19 ON.

Although the ON-signal 64 from the switch 19 is operated as one input of the AND-logic element 51' through the OR-logic element 50', the other input of the AND-logic element 51' maintains an overall OFF-condition unless the output 60 of the AND-logic element 51 turns OFF. Therefore, the output 60' of the AND-logic element 51' will maintain an OFF condition and not actuate the valve 8.

Therefore, the valve 7 and the control valve 10 are actuated upon a locking condition occurring at wheel brake 5.

Due to the actuation of the valve 7, the fluid communication between the master cylinder 2 and the wheel brake 5 is interrupted and instead the fluid communication between the wheel brake means 5 and the pressure reducing device 9 begins, while due to the actuation of the valve 10, the power piston 13 moves downward because of the pressure difference between the chambers 14 and 15, and accordingly, the pressure reducing piston 12 moves downward. This increases the capacity of the pressure reducing chamber 11 and decreases the pressure in the wheel brake 5 to terminate the locking condition of that wheel.

During the pressure decreasing operation at the wheel brake 5, if wheel brake 6 falls into a locking condition, the other sensor 20' also generates an ON-signal. At this time, however, since the output 60 of the AND-logic element still maintains ON-signal, the OFF-inverted output signal 66 through the NOT-logic element 52 still maintains to operate as one input of the AND-logic element 51'. Thus, even when the other sensor 20' generates an ON-signal when the sensor 20 generates an ON-signal, the other valve 8 is not actuated.

When the pressure reducing operation at the wheel brake 5 is sufficiently performed to return the wheel to a rotational condition, the sensor 20 generates an OFF-signal.

Due to the OFF-signal from the sensor 20, the output 63 of the AND-logic element 53 turns OFF which is fed to one input of the OR-logic element 54. Since both inputs of the element 54 are OFF-signals, the output thereof also turns OFF to cease actuation of the control valve 10.

The switch 19, however, maintains ON-signal until the power piston 13 moves upward and back to its original position.

Therefore, the switch 19 maintains an ON-signal even when the control valve 10 is deactivated. The ON-signal from the switch 19 is one input To the OR-logic element 50 and thus since one input thereof still maintains an ON signal, an ON-output signal is still generated in the AND-logic element 51. Therefore, during the pressure restoring operation, the valve 7 is actuated to communicate the pressure reducing chamber 11 with the wheel brake 5 so that the fluid in the chamber 11 may be fully returned to the braking circuit for the next pressure reducing operation.

During such pressure recovering or reducing operation, if the wheel corresponding to the wheel brake 5 again falls in a locking condition, then the sensor 20 again generates an ON-signal to actuate the control valve 10.

Assuming now that during braking operation, the wheel corresponding to the wheel brake 6 falls in locking condition prior to the wheel of the other brake 5, then the sensor 20' generates the ON-signal. At this time, since the sensor 20 generates OFF-signal, the output of the AND-logic element 51 maintains OFF condition, the inputs from the NOT-logic element 52 and the OR-logic element 50' are both ON to turn the output of the AND-logic element 51' to an ON-signal. Therefore, the valve 8 is actuated to change over the fluid communication of the wheel brake 6 from the master cylinder to the pressure reducing device 9. The On-signal from the AND-logic element 51' is operated as one input of the AND-logic element 53'. The other input thereof is directly fed from the ON-signal of the sensor 20' and therefore, the output of the AND-logic element 53' turns ON to actuate the control valve 10.

Thus, the pressure reducing operation at the wheel brake 6 begins. Due to the actuation of the control valve 10, the switch 10 also generates an ON signal. Accordingly, one input of the AND-logic element 51 from the OR-logic element 50 turns ON. However, due to the OFF-signal from the AND-logic element 51, the output 70 of the AND-logic element 71 turns OFF, while, due to the ON-signal from the AND-logic element 51', the output 70' of the NOT-logic element 52' turns OFF, and therefore the output 66' of the OR-logic element 72 turns OFF which is the other input of the AND-element 51. Thus, even when the switch 19 turns ON, the output 60 of the AND-logic element 51 maintains OFF-condition and not actuating the valve 7.

Therefore, even when the sensor 20 generates an ON signal under the pressure reducing operation at the wheel brake 6, the output 60 of the AND-logic element 51 maintains an OFF signal unless the output 60' of the AND-logic element 51' turns OFF.

Assuming now that, under the normal braking operation, both sensors 20 and 20' generate ON-signals simultaneously. In this instance, since all of the inputs to the AND-elements 51 and 51' have ON conditions due to the NOT-logic elements 52' and 52, then the outputs of the AND-logic elements 51 and 51' turn momentarily ON. However, due to such an ON-signal from the output 60 of the AND-element 51, the one input of the AND-logic element 51' through the NOT-logic element 52 turns OFF, and therefore, the output 60' of the element 51' turns OFF after such momentary ON-condition. Also, due to such momentary ON-condition of the AND-logic element 51', one input of the OR-logic element 72 because of the NOT-logic element 52' turns OFF momentarily. In this instance, however, due to the momentary ON-conditions of the outputs 60 and 60' of the AND-logic elements 51 and 51' the output 70 of the AND-logic element 71 turns ON which is fed to the other input of the OR-logic element 72. Therefore, the output 66' thereof maintains an ON signal during such momentary ON-conditions of the AND-elements 51 and 51'. After the output 60' of the AND-element 51' turns OFF, then the other input of the OR-logic element 72 turns ON through the NOT-logic element 52' to continue the ON-signal from the OR-logic element 72. Thus, even when both sensors 20 and 20' generate ON-signals simultaneously, only one valve 7 is actuated to prevent the locking condition of its wheel. The control valve 10, as before, is actuated at this time by reception of the ON-ouput signal of the AND-logic element 53.

Figure 3A:
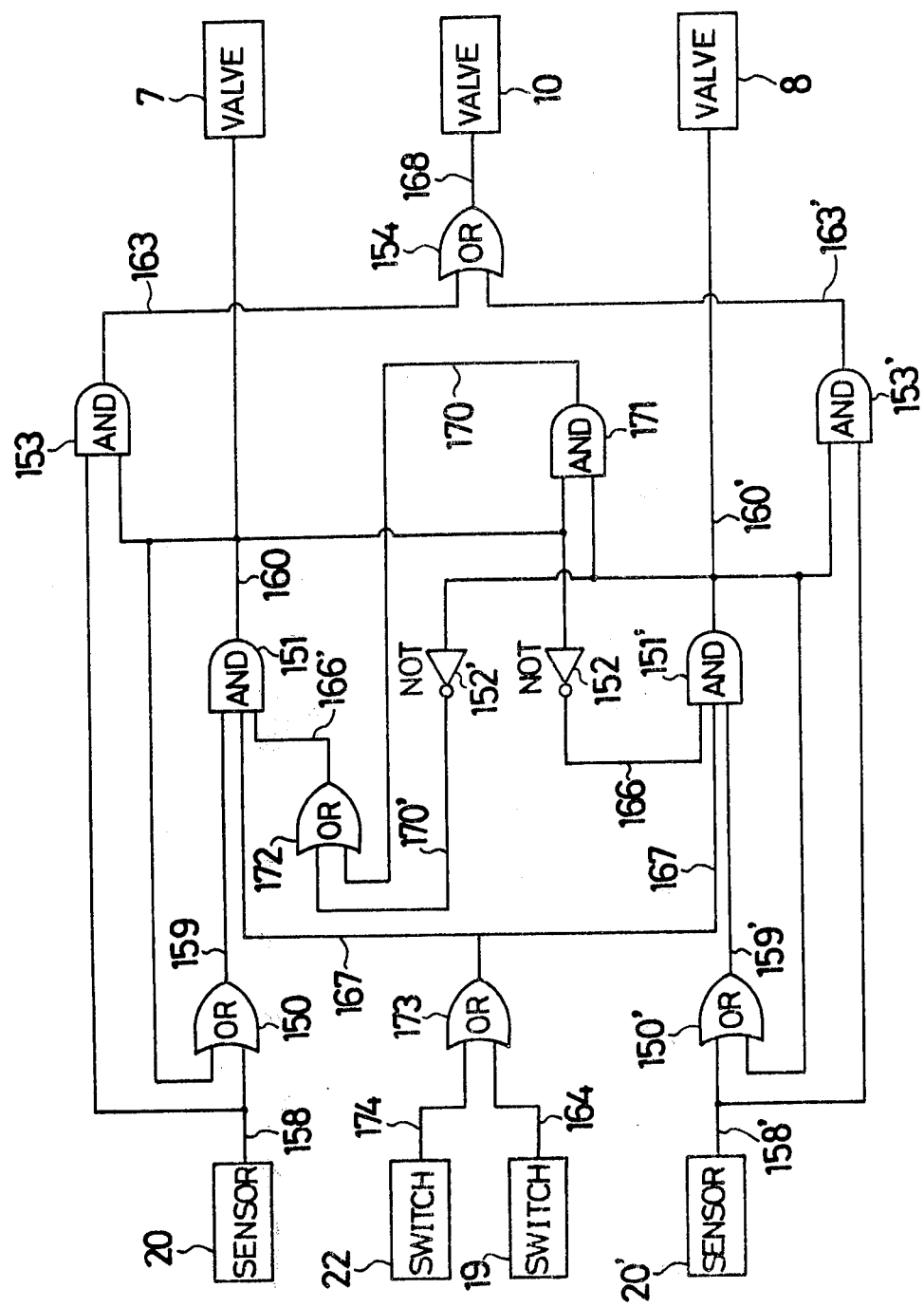
FIG. 3A is a circuit diagram of an alternative embodiment of the computer means 21 of FIG. 1.

FIG. 3A shows a further embodiment of the logic circuits of FIG. 3.

In this logic circuit, the switch 22 is added to sense the initiation of braking, i.e., the switch 22 is attached to the brake pedal 1 (FIG. 1) and turns ON when the pedal 1 is depressed. The output 174 of the switch 22 is operated as an input of an OR-logic element 173 while the output 164 of the switch 19 is operated as another input of the OR-logic element 173. The output 167 of the element 173 is an input to AND-logic elements 151 and 151'. The output 160 of the element 151 is fed back as an input to OR-logic element 150 while the output 160' of the element 151' is fed back as an input to the OR-logic element 150'.

The other logic elements and outputs thereof are approximately the same as the previous logic circuit (FIG. 3) and therefore, each reference numeral of FIG. 3 has been indexed to designate similar constructions and functions as in the previous circuit.

In this circuit, the brake pedal switch 22 is connected to the computer 21 so as to provide anti-skid brake operation only when the brake pedal is depressed, avoiding the erroneous operation which might occur if the computer means 21 received an error signal from either of the sensors.

The operation of the circuit of FIG. 3A is basically identical to the operation of the circuit in FIG. 3 with the exception that AND-logic elements 151 and 151' require three ON inputs before giving an ON output. This allows brake pedal switch 22 to negate any error signal generated by sensors 20, 20' or pressure reducer switch 19. Again, if both sensors 20 and 20' generate OFF signals as during normal vehicle operation, switch 19 and switch 22 would also be OFF and therefore valves 7, 8 and 10 would be in the OFF position. Under normal braking conditions switch 22 would generate an ON-signal allowing the output 167 of OR-logic circuit 173 to be an ON signal. Therefore, ON signals 167 and 166 and 166' would be applied to the AND-logic circuits 151 and 151'. However, the outputs of OR-logic circuits 150 and 150' will be OFF and therefore allow only an OFF output of 160 and 160' from AND-logic circuits 151 and 151', respectively. Thereby, AND circuits 153 and 153' will also generate only OFF signals causing valves 7, 8 and 10 to remain in the OFF condition.

If sensor 20 generates an ON signal during the normal braking operations (indicating a wheel lockup) both 20 and 22 will generate ON-signals. OR-logic circuit 150 will then generate an ON-signal output 159 allowing AND-logic circuit 151 to provide an ON-output 160 actuating valve 7. Additionally, the AND-logic circuit output 160 also provides an ON input to AND-logic circuit input 153 which in conjunction with the ON input from sensor 20 provides an ON output 163 which in turns causes OR-logic circuit 154 to provide an ON output 168 actuating valve 10. AND-logic circuit output 160 is also carried through NOT-logic circuit 152 providing an off signal 166 precluding any operation of AND-logic circuit 151' thus insuring that output 160' and valve 8 will remain OFF. As valve 10 has been actuated switch 19 will also generate an ON signal and if sensor 20' thereafter generates an ON signal, the continued presence of NOT-logic circuit 152 providing an OFF output 166 will require AND-logic circuit 151' to continue an OFF output 160' which will prevent actuation of valve 8. As the pressure in wheel brake 5 is reduced and it begins the normal rotational condition, sensor 20 will revert to producing an OFF signal. However, because pressure reducing device 9 has not completely returned to the FIG. 1 position, switch 19 will continue to provide an ON signal. If sensor 20' provides an ON signal at this point the operation of the valves 7, 8 and 10 will not be effected. The ON signal provided by OR-logic circuit 173 is still applied to AND-logic circuit 151 which in addition to the feedback of outut 160 into OR-logic circuit 150 providing an ON signal 159 allows the AND-logic circuit 151 to continue its ON signal output maintaining the actuation of valve 7. However, since sensor 20 is no longer supplying an ON signal AND-logic circuit 153 will only produce an OFF signal on output 163. AND-logic circuit 151' is maintained with an OFF signal output on 160' by the OFF output of NOT-logic circuit 152. Therefore, it can be seen that even though sensor 20 produces an OFF output and sensor 20' produces an ON output, the position of valve 7 will remain on with valves 8 and 10 in the OFF position. It is only when the pressure reducing device 9 has returned to the position of FIG. 1 that switch 19 will produce an OFF output. For the output of OR-logic circuit 173 to be an OFF signal the break switch 22 must also be momentarily released allowing AND-logic circuit 151 to terminate its ON output. It is at this point that if sensor 20' is still providing an ON output that the AND-logic circuit 151' will see three AND inputs actuating valves 8 and 10.

This then is the major operational difference between the logic circuitry in FIG. 3 and that disclosed in FIG. 3A. In FIG. 3 when the switch 19 turns OFF during a 20' ON signal, the valve 8 is actuated immediately whereas in FIG. 3A even with the switch 19 OFF the valve 8 is not actuated when signal 20' is present but only when the brake switch 22 provides an OFF signal.

Similarly if sensor 20' generates an ON signal prior to sensor 20 generating an ON signal, valve 7 will remain OFF with valves 8 and 10 being actuated. As in FIG. 3, if sensors 20 and 20' generate ON signals simultaneously during normal braking operations, valves 7, 8 and 10 will be momentarily actuated and thereafter valves 7 and 10 will remain actuated but valve 8 will be turned off. Again, in this circuit the wheel which first goes into a locked condition is controlled exclusively until it is completely recovered from the locking condition.

Figure 4:
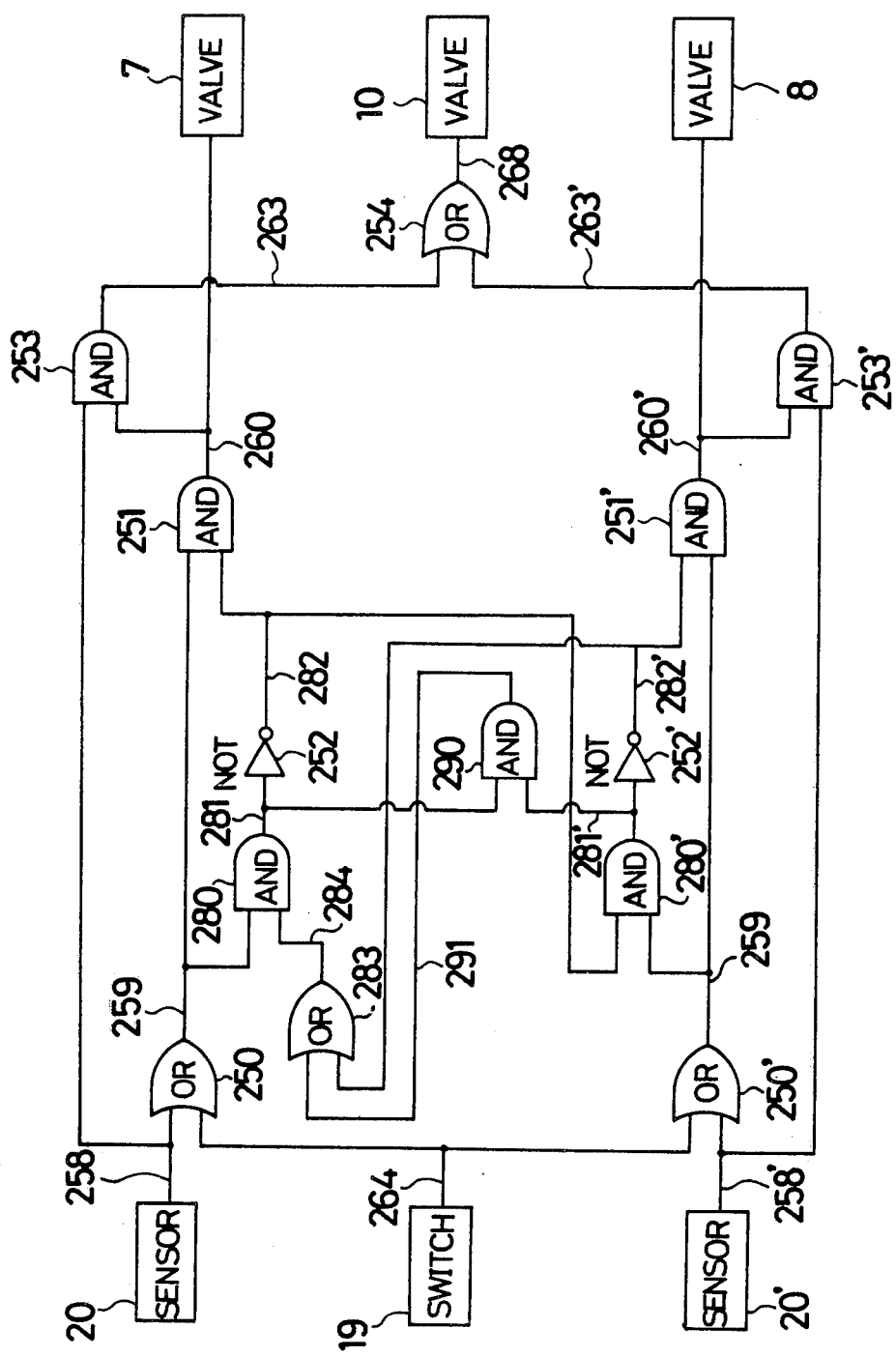
FIG. 4 is a circuit diagram of another alternative embodiment of the computer means 21 of FIG. 1.

In the logic circuit of FIG. 4, the wheel which first falls in a locking condition is not controlled but the next wheel which is in a locking condition is controlled.

The output 258 of the sensor 20 is an input to an OR-logic element 250 and an AND-logic element 253. The output 259 of the OR-logic element 250 is an input for AND-logic elements 251 and 280. The output 260 of the AND-logic element 151 operates as the other input of the AND-logic element 253 and also operates as an input to the valve 7. The output 263 of the AND-logic element 253 operates as an input of an OR-logic element 254 whose output controls valve 10.

The output 264 of the switch 19 is the other input of the OR-logic elements 250 and 250'. The output 258' of the sensor 20' is another input to the OR-logic element 250' and is also an input to an AND-logic element 253'. The output 259' of the OR-logic element 250' is an input for AND-logic elements 280' and 251'.

The output 260' of the AND-logic element 251' is an input to the valve 8 as well as the other input of AND-logic element 253'. The output 263' of the AND-logic element 253' is the other input of the OR-logic element 254.

The output 281 of the AND-logic element 280 is an input of a NOT-logic element 252 and AND-logic element 290. The output 282 of the NOT-logic element 252 operates as the other input of the AND-logic elements 251 and 280'. The output 281' of AND-logic element 280' is the other input of the AND-logic element 290 and is an input of a NOT-logic element 252'. The output 282' thereof operates as the other input of the AND-logic element 251' and also as an input of an OR-logic element 283. The output 291 of the AND-logic element 290 acts as the other input of the OR-logic element 283. The output 284 thereof is the other input of the AND-logic element 280.

As in FIGS. 3 and 3A, sensors 20 and 20' generate OFF signals under normal braking operations. Therefore, OFF signals will be applied to AND-logic elements 251, 251', 253 and 253' so that said elements'output are comprised of OFF signals and therefore valves 7, 8 and 10 are in the OFF condition. If sensor 20 generates an ON signal indicating a wheel that has locked up, the OR-logic element 250 provides an ON output 259 which in conjunction with the ON output of OR-logic element 283 provides two ON inputs for AND-logic element 280 and thus an ON input to NOT-logic element 252. The output 282 thereof is an OFF signal causing AND-logic element 251 to provide an OFF output 260. Output 260 insures that valve 7 as well as valve 10 remain cut off. Therefore, contrary to FIGS. 3 and 3A, the first sensor to generate an ON signal does not affect the OFF position of valves 7, 8 and 10.

If while sensor 20 is providing an ON signal, sensor 20' also provides an ON signal the operation is slightly different. It can be seen that the output of OR-logic element 250' goes from an OFF signal to an ON signal 259'. AND-logic element 280' still presents an OFF signal output which, after going through NOT-logic element 252' provides an ON signal output 282'. ON outputs 282' and 259' allow AND-logic element 251' to produce an ON output 260' actuating valve 8. ON output 260' also combines with ON output 258' of sensor 20' to allow AND-logic element 253' to also produce an ON output 263' which through OR-logic element 254 actuates valve 10. Shortly after actuation of control valve 10 switch 19 turns ON without affecting the outputs of OR-logic elements 250 or 250'. Similarly, it can be seen that if the order of operation is such that sensor 20' first generates an ON signal and then sensor 20 subsequently generates an ON signal valves 7 and 10 will be actuated with valve 8 unaffected. Thus, with the logic circuitry of FIG. 4 the wheel which is locked up last is the brake system whose pressure is controlled by pressure reducer 9 and control valve 10.

Where sensors 20 and 20' generate ON signals simultaneously the logic as to which wheel is controlled is as follows. Momentarily OR-logic elements 250 and 250' produce ON outputs 259 and 259'. Prior to the sensor signals NOT-logic element outputs 282 and 282' are ON signals and combine with the initial 259 and 259' On outputs to turn AND-logic elements 251 and 251' such that ON outputs 260 and 260' are the result. These in conjunction with ON pulses 258 and 258' result in ON signals at 263 and 263'. Immediately after this initial pulse however, 282' goes to an OFF signal as ON signals 282 and 259' are applied to AND-logic element 280' resulting in an ON output. This is applied to NOT-logic element 252' which produces an OFF output signal 282' cutting off AND-logic element 251' such that output thereof 260' is an OFF signal. This signal thereby causes valve 8 to remain closed although ON signals to valve 7 and valve 10 allow them to be actuated. This then insures logic choice even with simultaneous sensor inputs such that valve 7 and thereby the brake pressure in wheel brake 5 is controllably reduced.

Figure 4A:
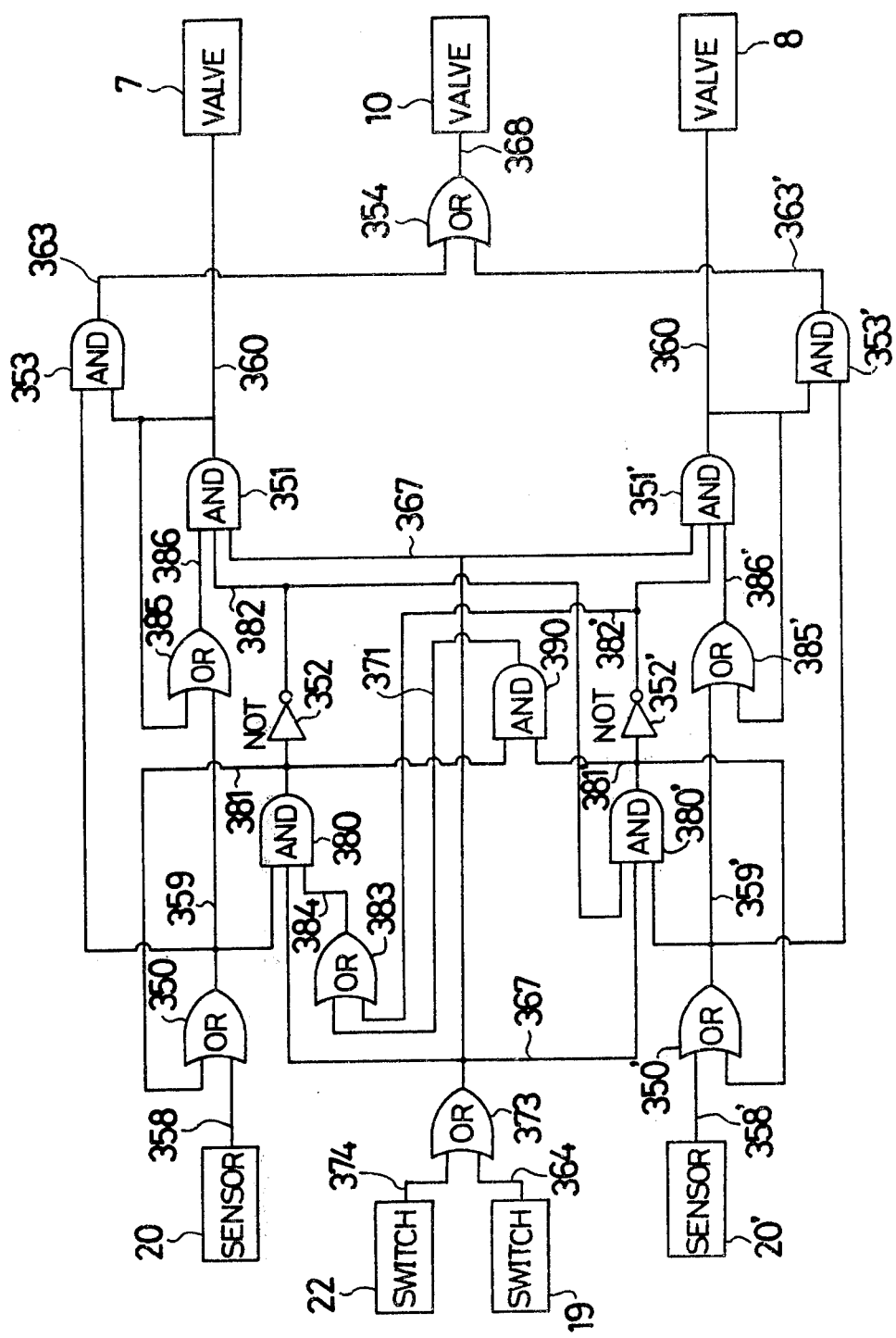
FIG. 4A is a circuit diagram of a still further embodiment of the computer means 21.

FIG. 4A is similar to FIG. 4 with an additional brake switch 22 added to prevent operation of the pressure reducing system when the brake pedal is not depressed much the same as FIG. 3A was a modification of FIG. 3. As was accomplished earlier, the numbers of the various components have been indexed by 100 from 200 series in FIG. 4 to 300 series in FIG 4A for simplicity of comparison. In FIG. 4A, pedal switch 22 provides an ON output only when depressed and is inputed into OR-logic element 373. Switch 19 from pressure reducing device 9 similarly is inputed into OR-logic element 373 whose output 367 is directed towards AND-logic elements 380, 380', 351 and 351', all of which require three On inputs for an ON output signal. Under normal vehicle operation AND-logic circuits 380 and 380' provide an OFF output allowing NOT-logic elements 352 and 352' to provide an ON output 382 and 382', respectively. However, inputs to AND-logic elements 351 and 351' allow it to provide an OFF signal 360 and 361' ensuring that valves 7 and 8 remain in the OFF position. The outputs 360 and 360' are inputs to AND-logic circuts 353 and 353' ensuring that their output 363 and 363' is also an OFF signal which prevents valve 10 from actuating.

If the brake pedal is depressed, switch 22 provides an ON signal to OR-logic circuit 373 which then gives an ON output 367. If the wheels have not begun to lock up at this point there will still be no ON output by sensor 20 or 20' and therefore OR-logic elements 350, 350', 385 and 385' provide the OFF output 386 and 386' cutting off AND-logic circuits 351 and 351'. As before, the OFF output 360 and 360' maintain AND-logic circuits 353 and 353' in an OFF condition such that valves 7, 8 and 10 remain inactivated.

Since sensor 20 is the first sensor to provide an ON output the ON output of OR-logic element 350 will provide three ON inputs to AND-logic circuit 380. The output 381 of the AND-logic circuit 380 will then be an ON signal which is supplied to NOT-logic element 352 whose output then is an OFF signal. This OFF signal is supplied to AND-logic element 351 such that its output remains an OFF signal since there is no input to sensor 20' the corresponding AND-logic circuit 351' remains in an OFF condition also. Then, as befoe, valves 7, 8 and 10 remain in the OFF or inactivated condition. If sensor 20' also provides an ON output during the time when sensor 20 is providing an ON output, the ON signal is transmitted through OR-logic circuits 350' and 385' and inputed into AND-logic element 351'. Since the break pedal is still depressed the output of the break switch and OR-logic element 373 will be an ON signal 367. Additionally, output 382' remains an ON signal and therefore three ON signals allow an ON output from AND-logic element 351'. This opens valve 8 and also supplied an ON output signal 360' to AND-logic element 353'. This combined with the ON signal output of the OR-logic element 350' allows AND-logic element 353' to provide an ON output 363' to OR-logic element 354. The output of this element 368 is then an ON signal activating valve 10. Therefore, the pressure reduction is accomplished on the latter wheel to lock up rather the first wheel as in FIGS. 3 and 3A. As in FIG. 3A, the system cannot be initiated unless the brake pedal is first depressed thus providing a measure of safety as far as erroneous operation is concerned.

Of course if sensor 20' had generated the first ON signal with sensor 20 subsequently developing an ON signal the wheel brake system 5 would have been the system whose pressure was controllably reduced. As in FIGS. 3, 3A and 4, if both sensors provide an On output simultaneously, there would be a momentary ON condition in outputs 382 and 382'. Immediately thereafter however, 382' would become an OFF output by virtue of the fact that AND-logic element 380' would begin generating an ON output which would be inverted by NOT-logic element 352' into an OFF output. This OFF output would cut off AND-logic element 351' providing an OFF output 360' which would cut off valve 8. Therefore, if sensors 20 and 20' generated an ON signal simultaneously, the result would be valves 7 and 10 being actuated with valve 8 remaining closed.

Figure 5:
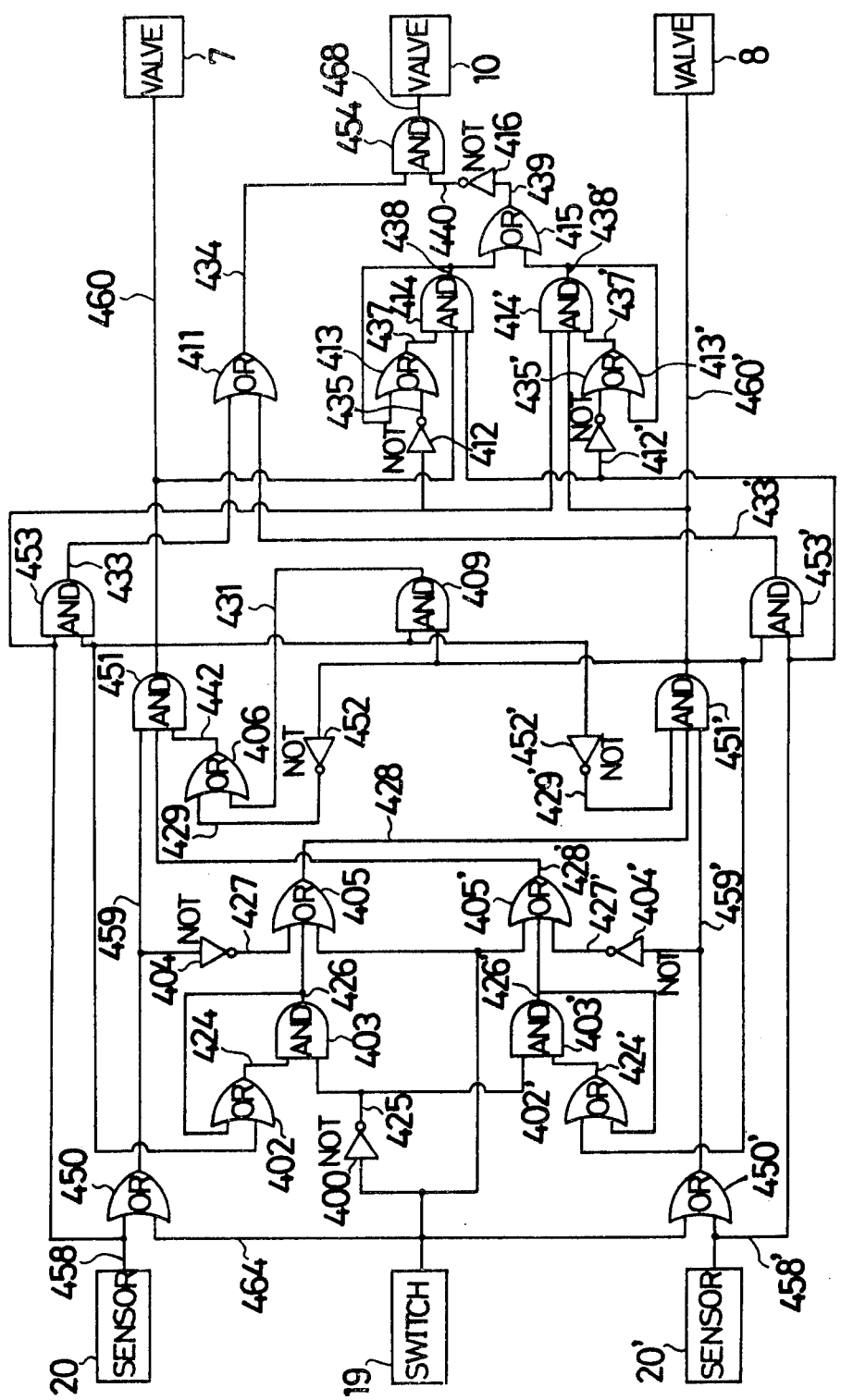
FIG. 5 is a circuit diagram of a further embodiment of the computer means 21 of FIG. 1.

In the circuit of FIG. 5 the wheels of the two brake circuits are controlled alternately if both sensors 20, 20' generate On signals indicative of the fact that both wheels are loced.

The output 458 of the sensor 20 is an input of an OR-logic element 450 and is an AND-logic element 453. The output 458 of the sensor 20 is also an input of a NOT-logic element 412 as well as an input of an AND-logic element 414'. The output 459 of the OR-logic element 450 operates as an input to AND-logic element 451 as well as NOT-logic element 404. The output 460 of the AND-logic element 451 is an input to the AND-logic element 453 and also is a control input to the valve 7. The output 460 further operates as an input of an AND-logic element 409 and also as an input of a NOT-logic element 452'. The output 460 further operates as an input of an OR-logic element 402 and AND-logic element 414.

The output 433 of the AND-logic element 453 operates as an input of an OR-logic element 411. The output 434 thereof is an input to an AND-logic element 454.

The output 464 of the switch 19 is the other input of the OR-logic element 450 and is an input of an OR-logic element 450'. The output 464 also operates as an input of a NOT-logic element 400, an input of an OR-logic element 405, and as an input of an OR-logic element 405'.

The output 458' of the sensor 20' operates as the other input of the OR-logic element 450', an input to AND-logic element 453', an input of a NOT-logic element 412' as well as another input of the AND-logic element 414.

The output 459' of the OR-logic element 450' is an input to NOT-logic element 404' and to AND-logic element 451'. The output 460' of the AND-logic element 451' operates as a control input to the valve 8, another input to the AND-logic element 414', the other input of the AND-logic element 453' and an input to OR-logic element 402'. The output 460' is also the other input of the AND-logic element 409 as well as an input of a NOT-logic element 452. The output 427 of the NOT-logic element 404 is operated as another input of the OR-logic element 405. The output 428 thereof operates as another input of the AND-logic element 451'. The other input thereof is fed from the output 429' of the NOT-logic element 452'.

The output 424 of the OR-logic element 402 is an input of an AND-logic element 403. The output 426 thereof is fed back to the other input of the OR-logic element 402 and also operates as the other input of the OR-logic element 405.

The output 425 of the NOT-logic element 400 in the other input of the AND-logic element 403 and also is an input of an AND-logic element 403'. The output 426' thereof operates as another input of the OR-logic element 405' and also is fed back to the other input of the OR-logic element 402'. The output 424' thereof is the other input of the AND-logic element 403'.

The output 427' of the NOT-logic element 404' is the other input to the OR-logic element 405'. The output 428' thereof operates as another input of the AND-logic element 451.

The output 429 of the NOT-logic element 452 is an input to an OR-logic element 406. The output 442 thereof is the other input of the AND-logic element 451.

Further, the output 433' of the AND-logic element 453' operates as the other input of the OR-logic element 411. The output 435 of the NOT-logic element 412 is an input of an OR-logic element 413. The output 437 thereof operates as the other input of the AND-logic element 414. The output 438 thereof is an input to an OR-logic element 415 and is also fed back to the other input of the OR-logic element 413.

The output 435' of the NOT-logic element 412' is an input of an OR-logic element 413'. The output 437' thereof operates as the other input of the AND-logic element 414'. The output 438' thereof operates as the other input of the OR-logic element 415 and is fed back to the other input of the OR-logic element 413'. The output 439 of the OR-logic element 415 is an input to a NOT-logic element 416. The output 440 thereof is the other input of the AND-logic element 454. The output 468 thereof operates as a control input of the control valve 10.

The operation of the circuit of FIG. 5 is as follows. Again both sensors 20 and 20' generate OFF-signals under normal braking operation. Two of the inputs of the AND-logic elements 451 and 451' receive ON-signals. However, the third inputs received by 451 and 451' are OFF-signals due to the sensors 20, 20' and the switch 19 being in the downward condition and therefore their respective outputs 460, 460' are OFF-signals.

One input of the AND-logic element 454 receive an ON-signal which was inverted through the NOT-logic element 416. However, the other input of the AND-logic element 454 is an OFF-signal 434 and accordingly the output 468 is an OFF-signal. Thus, the valves 7 and 8, as well as the control valve 10, are not actuated under the above normal operating condition.

Figure 6:
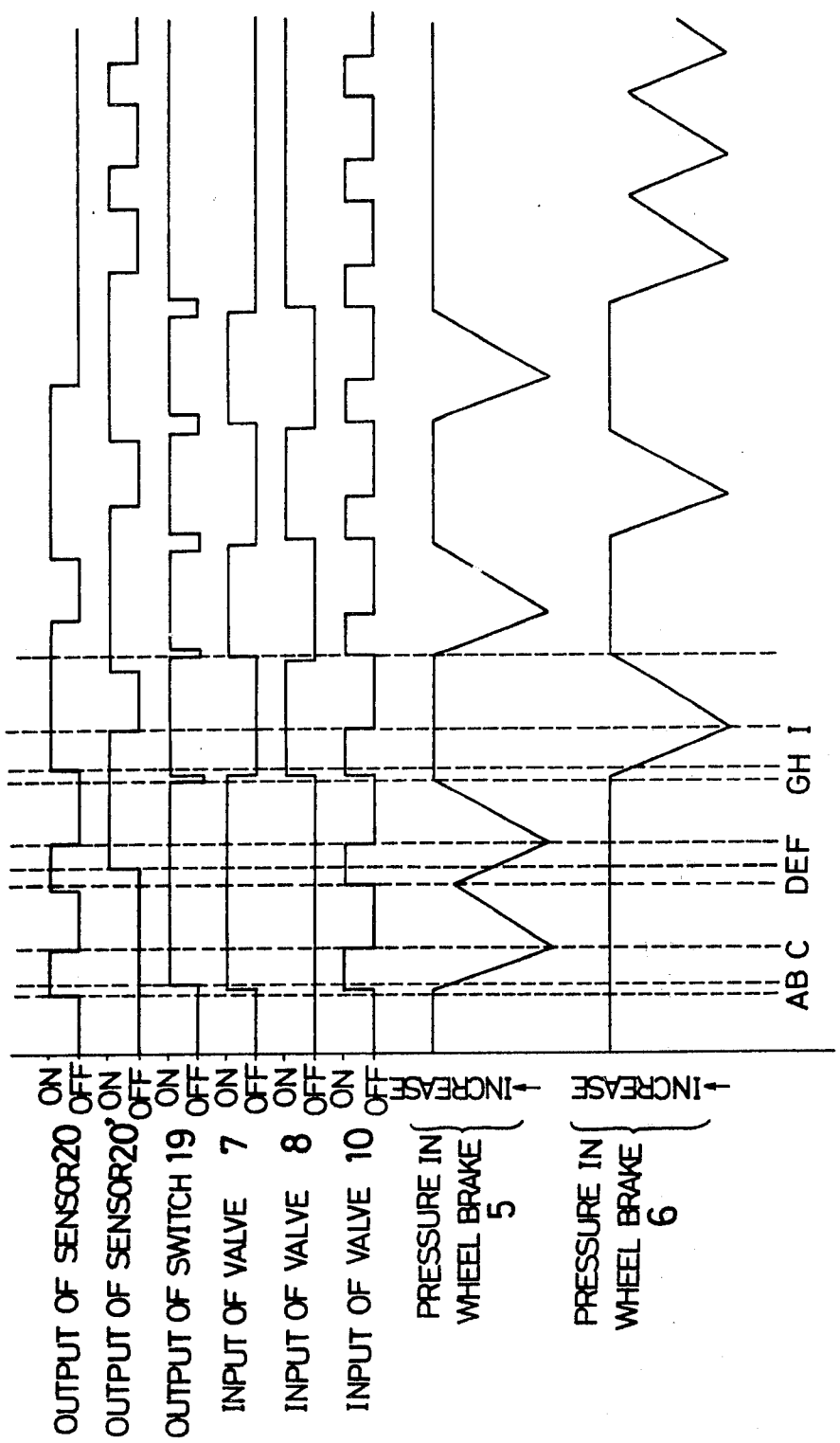
FIG. 6 is an explanatory view of the operation of each element in FIG. 5.

Assuming now that the wheel corresponding to the wheel brake 5 is being locked, then the sensor 20 generates an ON-signal (the condition of A in FIG. 6). Due to the ON-signal of the sensor 20, all of the inputs of the AND-logic element 451 receive ON-signals and it generates an ON-output signal. The ON-output 460 actuates the valve 7. Since the output 460 thereof is also one input of the AND-logic element 453, the output 434 of the OR-logic element 411 turns ON which eventually provides an ON-input 434 to AND-logic element 454.

As to the output 460' of the AND-logic element 453', due to the ON-output 460, one input of the element 453' through the NOT-logic element 452' turns OFF and another input through the OR-logic element 450' maintains OFF and therefore the output 460' still maintains an OFF-signal so as to actuate the valve 8.

Each input to the AND-logic elements 414 and 414' receives an OFF-signal from the output 460 and 460' or from the outputs 458 or 458' and therefore the outputs 438 and 438' of the elements 414 and 414', respectively, maintain an OFF signal output. The outputs 438 and 438' are both inputs of the OR-logic element 415 which is inverted to an ON signal by the NOT-logic element 416.

Thus, since both inputs of the AND-logic element 454 receive ON-signals, the output thereof turns ON to actuate the control valve 10. As in previously described circuits upon actuation of the control valve 10, the switch 19 turns ON (the condition of B in FIG. 6).

So long as the output 460 is ON, the OFF-inverted output 429' of the NOT-logic element 452' operates as one input of the AND-logic element 451' insuring that there is only an OFF-output. Therefore, the valve 8 is not actuated even when the output 459' of the OR-logic element 450' turns ON due to the ON-signal from the switch 19.

Furthermore, although the output 427' of the NOT-logic element 404' turns OFF due to the ON-output 459', the ON-output 464, operating as another input of the OR-logic element 405', insures that the output 428' will be ON. This output is an input to the AND-logic element 451 keeping output 460 in an ON condition.

Assuming now that the pressure in the wheel brake 5 as well as the pressure reducing chamber 11 of the device 9, is sufficiently reduced to recover the wheels rotational condition, sensor 20 will begin generating an OFF-signal (the condition of C in FIG. 6). Due to the OFF-signal from the sensor 20, the output 433 of the AND-logic element 453 turns OFF which was the only ON input to the OR-logic element 411. Therefore, the output 434 thereof turns OFF which turns off AND-logic element 454 and control valve 10. Due to the deactuation of the control valve 10, the power piston 13, more clearly shown in FIG. 1, is moved upwardly to its original position by the spring 16 (since the pressure difference between the chambers 13 and 14 has disappeared). During such pressure recovery operation, the switch 19 maintains the ON signal until the power piston 13 returns to its original position as shown in FIG. 1.

So long as the switch 19 maintains ON, the output 459 of the OR-logic element 450 maintains ON, the output 460 of the AND-logic element 451 maintains ON hereby still actuating the valve 7.

Assuming now that during such pressure recovering operation, the sensor 20 again generates an ON-signal, sensing the corresponding wheel is again being locked (the condition D of FIG. 6), the control valve 10 will be again actuated to reduce the pressure in the wheel brake 5.

Assuming now that during such pressure reducing operation at the wheel brake 5, wheel brake 6 falls also into a locking condition. At this time, the other sensor 20' will also generate an ON-signal (the condition of E in FIG. 6).

At this time, the output 460 of the AND-logic element 451 remains ON, the output 429' of the NOT-logic element 452' is maintained in the OFF-condition which is one input of the AND-logic element 451'. Thus, at this time, the output 460' thereof still remains OFF so as not to actuate the valve 8. The output 438 of the AND-logic element 414 remains OFF since one of the inputs received is the OFF-inverted signal through the NOT-logic element 412. Similarly the output 438' of the AND-logic element 414' also remains OFF due to the OFF-output 460'. The OR-logic element remains OFF and therefore the output 440 of the NOT-logic element 416 remains ON. Since the output 434 of the OR-logic element 411 is also ON, the output 468 of the AND-logic element 454 remains ON to continue actuation of the control valve 10.

Assuming now that during the pressure reducing operation of the wheel brake 5, the sensor 20 senses the wheel recovery condition and generates OFF-signal (the condition of F in FIG. 6). Further assume that the other sensor 20' is still generating an ON-signal indicative of the wheel brake 6 in a locking condition. The control valve 10 is deactuated since output 433 of the AND-logic was the only ON signal applied to OR-logic element 411 and is now OFF. However, as mentioned above, the switch 19 maintains ON until the power piston 13 (FIG. 1) returns to its original position, and therefore, the valve 7 remains actuated until there is a complete pressure recovery at the wheel brake 5.

Assuming now that such a pressure recovery has been accomplished, and that the other sensor 20' still maintains ON-signal (the condition of G in FIG. 6), then the pressure reducing operation at wheel brake 6 will begin as is described hereinafter.

Both outputs 458 and 464 turn OFF, and therefore, the output 459 of the OR-logic element 450 turns OFF. Due to one input of the AND-logic element 451 receiving OFF-signal, the output 460 turns OFF which deactuates valve 7. Because of the OFF-output signal 450, the output 429' of the NOT-logic element 452' turns ON which is one input to the AND-logic element 951'. Another input thereof is the output 428 of the OR-logic element 405, which is also an ON-signal because one input of the OR-logic element 405 is the ON-inverted output 427 of the NOT-logic element 404. Since the three inputs of the AND-logic element 451' receive ON-input signals, the output 460' turns ON to actuate the valve 8.

As to the control valve 10, since the output 433' of the AND-logic element 453' turns ON and is one input of the OR-logic element 411, one input of the AND-logic element 454 receives an ON-signal. One input of the AND-logic element 414 receives OFF-signal from the output 460 while one input of the AND-logic element 414' also receives an OFF-signal from the output 458 of the sensor 20 providing OR-logic element 415 with an OFF output 439. Thus the other input of the AND-logic element 454 receives an ON inverted signal through the NOT-logic element 41b. Since both inputs of the AND-logic element 454 receive ON-signals, the output 468 turns ON to actuate the control valve 10. Actuation of valves 8 and 10 begins the pressure reducing operation for wheel brake 6 and again turns ON switch 19.

Assuming now that, during such pressure reducing operation at the wheel brake 6, the other sensor 20 again generate an ON-signal (the condition of H in FIG. 6). Although the output 459 turns ON, the output 442 of the OR-logic element 406 turns OFF due to the OFF-inverted output 429 of the NOT-logic element 452 which is one input of the OR-logic element 406 (the other input thereof also receives OFF-signal from the output 431 of the AND-logic element 409). Thus, the output 460 remains OFF even when the sensor 20 generate ON-signal.

Assuming now that during such pressure reducing operation at the wheel brake 6, the sensor 20' generates an OFF-signal indicating the end of the braked wheel (as indicated by I in FIG. 6). At this time, the output 433' of the AND-logic element 453' turns OFF, and since output 460 and thereby AND-logic element 453 remain OFF, the output 434 turns OFF which turns AND-logic element 454 and valve 10 OFF. However, switch 19 remains ON until the power piston 13 returns to its original position and therefore the output 460' of the AND-logic element 451' maintains ON to continue the actuation of the valve 8.

After the power piston 13 returns to its original position to turn the switch 19 OFF and if sensor 20 continues to generate an ON-signal, the pressure reducing operation then will be performed at the wheel brake 5 instead of the wheel brake 6. Thus, the wheels of each braking circuit are controlled alternately by only one anti-skid actuator.

The operation of FIG. 5, where both sensors 20 and 20' generate ON-signals simultaneously will now be described. Prior to this, since the outputs of 428' and 442 of the OR-logic elements 405' and 406', respectively, have been ON signals and since the outputs 429' and 428 of the NOT-logic element 452' and the OR-logic element 405, respectively, have been ON-signals, when both sensors 20 and 20' generate ON-signals, the outputs 460 and 460' simultaneously turn ON. At this moment, the output 431 of the AND-logic element 409 turns ON due to both inputs thereof receiving ON signals from the outputs 460 and 460'. Also the outputs 424 and 424' of the OR-logic elements 402 and 402' turn ON due to the one input thereof receiving the ON-signal from the outputs 460 and 460'.

After such momentary changes of outputs 460 and 460', the output 429' of the NOT-logic element 452' turns OFF due to the ON-output signal of the output 460 and therefore the output 460' of the AND-logic element 451' again turns OFF.

Although the output 429 of the NOT-logic elements 452 turns OFF momentarily due to the momentary ON-output 460', the output 431 of the AND-logic element 409 turns ON as is described before and therefore the output 442 of the OR-logic element 406 remains ON. Likewise, the output 429' of the NOT-logic element 404' turns OFF due to the ON-output 459' of the OR-logic element, the output 424' of the OR-logic element 402' turns ON due to the momentary ON-output 460'. Since the output 415 of the NOT-logic element 400 maintains ON due to the OFF-signal of the switch 19, the output 426' of the AND-logic element 403' turns ON and therefore the output 428' of the OR-logic element 405' remains ON. Therefore, the three inputs, 459, 442 and 428', of the AND-logic element 451 receive ON-signals and the output 460 thereof maintains ON to actuate the valve 7. Thus, even when both sensors 20, 20' generate ON-signals simultaneously, only one wheel of the brake circuits is controlled.

Figure 7:
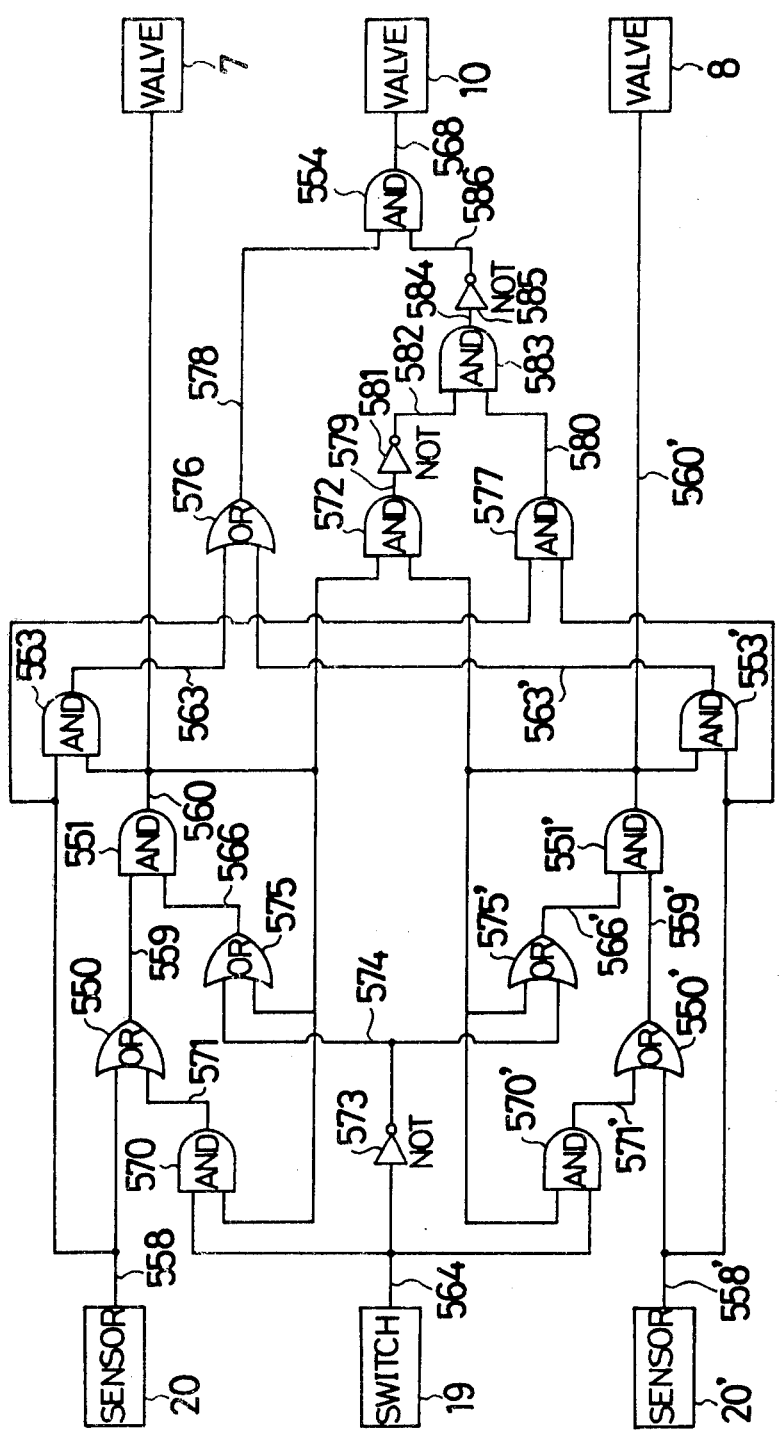
FIG. 7 is a circuit diagram of a still further embodiment of the computer means 21 of FIG. 1.

In the circuit of FIG. 7 which is a further embodiment of computer means 21, a wheel, which first incurs a locking condition, will be controlled and if a wheel of another braking circuit also begins a locking condition during the controlling of the first wheel the second wheel is also controlled together with the first wheel.

An output 558 of the sensor 20 is an input to OR-logic element 550 and the output 559 thereof operates as an input of an AND-logic element 551. The output 560 of the element 551 operates as a control input to the valve 7.

The output 558 of the sensor 20 is also an input of an AND-logic element 553. The output 563 of the AND-logic element 553 operates as an input of an OR-logic element 576. The output 578 thereof operates as an input of an AND-logic element 554 whose output 568 is a control input of the control valve 10. The output 558 of the sensor 20 also operates as an input input to an AND-logic element 577.

An output 564 of the sensing switch 19 is an input to AND-logic elements 570, 570' and a NOT-logic element 573. The output 571 of the element 570 is a second input of the OR-logic element 550, while the output 571' of the element 570' is an input of an OR-logic element 550'. The output 574 of the NOT-logic element operates as an input to OR-logic elements 575 and 575'. The output 566 of the element 575 is another input of the AND-logic element 551 while the output 566' of the element 575' is an input of AND-logic element 551'.

An output 558' of the sensor 20' is another input of the OR-logic element 550' and further operates as an input of an AND-logic element 553'. The output 558' also operates as another input of the AND-logic element 557. The output 559' of the OR-logic element 550' is another input of the AND-logic element 551'. The output 560' is the control input of the valve 8. The output 560' also operates as inputs to AND-logic elements 553', 572 and 570', and OR-logic element 575'.

The output 563' of the AND-logic element 553' is operated as another input of the OR-logic element 576.

The output 560 of the AND-logic element 551 is further operated as inputs of AND-logic elements 553, 572, and 570, and OR-logic element 575. The outputs 579 of the AND-logic element 572 operates as an input of a NOT-logic element 581, the output 582 of which operates as an input of an AND-logic element 583. The output 580 of the AND-logic elements 577 is the other input to the AND-logic element 583. The output 584 thereof is an input of a NOT-logic element 585, the output 586 of which operates as another input to the AND-logic element 554.

Under normal braking or normal running condition of the vehicle, all outputs 558, 564 and 558' remain in OFF conditions, and therefore, only the inverted output signals of the NOT-logic elements 573, 581 and 585 are ON conditions and therefore, ON condition signals are as follows: output 574 of the NOT-logic element 573; outputs 566 and 566' of the OR-logic elements 575 and 575'; output 582 of the NOT-logic element 581; and output 586 of the NOT-logic element 585. In this condition, especially during normal braking operation, when one sensor, for example, the sensor 20 senses a locking condition of the corresponding wheel, it generates an ON-output signal therefrom (the output 558 turns ON). Due to the ON-output signal 558, the output 559 of the OR-logic element 550 turns ON and therefore, both inputs of the AND-logic element 551 are ON. The output 560 thereof also turns ON which is directly fed to the input of the valve 7 thereby to actuate the same. At this time, since both inputs of the AND-logic element 553 are turned ON, the output 563 thereof also turns ON, and therefore, the output 578 of the OR-logic element 576 turns ON. Thus, both inputs of the AND-logic element 554 are turned ON and the output 568 turns ON to actuate the control valve 10. As to the sensor 20' it generates OFF-output signals under such condition, and therefore, the output 560' of the AND-logic element 551' maintains an OFF condition and does not actuate the valve 8.

The sensing switch 19 generates ON output signal when the control valve 10 begins to actuate the power piston 13 of the pressure reducing means 9 as in FIG. 1. This condition is illustrated in "A" area of FIG. 8.

If sensor 20 generates an ON-signal while sensor 20' is maintaining an ON-signal (as B of FIG. 8) the valve 7 will not be activated until switch 19 is momentarily turned off. This OFF-signal allows the output 574 of NOT-logic element 573 to turn ON. This ON-output 574 through OR-logic element 575 allows AND-logic element 551 to turn ON and activate valve 7. Once valve 7 is activated the control valve 10 continues to control the pressure reducing operation to both wheels until the sensors produce OFF-signals and the pressure in both systems returns to its normal level.

Next, if both sensors 20, 20' generate ON-signals simultaneously, the conditions of outputs and inputs of the elements in FIG. 7 are as follows. Just as with a single wheel in a locking condition the ON-output 558 will actuate valve 7 and maintain it in an ON condition after switch 19 turns ON. Similarly, the output 558' of sensor 20' will turn valve 8 to an ON condition. It can be seen that the inputs to AND-logic element 572 are ON and therefore its ON output will turn NOT-logic element OFF maintaining AND-logic element 582 in an OFF condition. The OFF-input to NOT-logic element 585 allows an ON-output 586 to AND-logic element 554 which in conjunction with ON-output 578 provides an ON-output to valve 10 (as shown at the beginning of C in FIG. 8). Therefore if outputs of sensors 20 and 20' are simultaneously ON, the control valve 10 will reduce the pressure in both wheel circuits concurrently and continue to cycle until the sensor outputs are OFF and the pressure has been increased to the normal level (as shown at the end of C in FIG. 8).

Obviously, numerous modifications and variations of the present invention are possible in the light of the above teachings. It is therefore to be understood that within the scope of the appended claims the invention may be practiced otherwise than as specifically described therein.

What is claimed is:

1. An anti-skid brake control system for a vehicle having a plurality of independent fluid brake circuits, comprising:

a master cylinder for supplying fluid under operator-controlled pressure to said plurality of fluid brake circuits and having a plurality of outlets;

first and second fluid brake circuits connected respectively to first and second outlets of said master cylinder and each circuit having at least one wheel brake means and a corresponding wheel;

first and second change over valve means interposed between said first outlet of said master cylinder and said wheel brake means of said first brake circuit and between said second outlet of said master cylinder and said wheel brake means of said second brake circuit, respectively, and each change over valve means being operable for controlling the fluid communication therebetween;

a single pressure reducing means including a single pressure reducing chamber connected to said first and second change over valve means, a single pressure reducing piston slidably disposed within said pressure reducing chamber for increasing and decreasing the capacity thereof, and a single servo actuator said reducing piston;

first and second sensing means for sensing rotational conditions of wheels associated with said wheel brake means of said first and second brake circuits respectively, each sensing means generating an output signal in response to the rotational condition of the corresponding wheel of said wheel brake means; and a computer means electrically connected to said first and second change over valve means, and to said servo motor of said pressure reducing means, said computer means generating and transmitting first, second, and third signals to said first and second change over valve means and said servo actuator, respectively, upon receipt of said output signals from said first and second sensing means.

2. An anti-skid brake control system as set forth in claim 1, wherein said first change over valve means is actuated to interrupt fluid communication between said master cylinder and said wheel brake means of said first brake circuit and instead to allow fluid communication between said wheel brake means of said first brake circuit and said pressure reducing chamber upon receipt of said first signal from said computer means indicating the corresponding wheel may be locked, while said second change over valve means is actuated to interrupt fluid communication between said master cylinder and said wheel brake means of said second brake circuit and instead to allow fluid communication between said wheel brake means of said second brake circuit and said pressure reducing chamber upon receipt of said second signal from said computer means indicating the corresponding wheel may be locked, and wherein said servo actuator of said pressure reducing means is actuated to move said pressure reducing piston, increasing the capacity of said pressure reducing chamber upon receipt of said third signal from said computer means indicating at least one of the wheels of said both wheel brake means may be locked.

3. An anti-skid brake control system for a vehicle to alleviate the detrimental effects of said vehicle wheels locking up during braking, said vehicle having a plurality of independent fluid brake circuits, said system comprising:

a master cylinder for supplying fluid under operator-controlled pressure to said plurality of fluid brake circuits and said master cylinder having a plurality of outlets, the number of which corresponds to that of said fluid brake circuits;

the first fluid brake circuit fluidically connected to a first outlet of said master cylinder and having at least one wheel brake means for slowing any rotational velocity of the wheel;

the second fluid brake circuit fluidically connected to a second outlet of said master cylinder and having at least one wheel brake means for slowing any rotational velocity of the wheel;

a first change over valve means interposed between said first outlet of said master cylinder and said wheel brake means of said first brake circuit and operable for controlling the fluid communication therebetween, said change over valve means additionally operable to place said wheel brake means in fluid communication with a pressure reducing means, a second change over valve means interposed between said second outlet of said master cylinder and said wheel brake means of said second brake circuit and operable for controlling the fluid communication therebetween, said change over valve means additionally operable to place said wheel brake means in fluid communication with a pressure reducing means;

a single pressure reducing means connected to said first and second change over valve means and including a pressure reducing chamber, a servo-actuator to increase and decrease the capacity of said pressure reducing chamber, said pressure reducing chamber being communicable with one of said wheel brake means upon operation of the corresponding change over valve means;

a first sensing means to sense the rotational condition of a wheel associated with said wheel brake means of said first brake circuit and generating an output signal in response to said rotational condition of the wheel;

a second sensing means sensing the rotational condition of a wheel associated with said wheel brake means of said second brake circuit and generating an output signal in response to said rotational condition of the latter wheel; and a computer means electrically connected to said first and second sensing means, to said first and second change over valve means, and to said servo-actuator of said pressure reducing means, said computer means generating and transmitting signals to said first and second change over valve means and said servo-actuator upon receipt of said output signals from said first and second sensing means, whereby the pressure in either one of said wheel brake means may be selectively controlled in order to obviate a locking condition of the wheel associated therewith.

4. An anti-skid brake control system as set forth in claim 3, wherein said computer means controlls the pressure in said wheel brake means which first incurs a locking condition of the wheel associated therewith.

5. An anti-skid brake control system as set forth in claim 3, wherein said computer means controlls the pressure in the second of said wheel brake means to incur a locking condition of the wheel associated therewith.

6. An anti-skid brake control system as set forth in claim 3, wherein said computer means alternately controlls the pressure in said wheel brake means of said first and second circuits upon both wheels associated with said respective wheel brake means incurring a locked condition.

7. An anti-skid brake control system as set forth in claim 3, wherein said first fluid brake circuit includes one front wheel brake means, one rear wheel brake means, said first change over valve means is disposed within the rear wheel brake means circuit, and wherein said second fluid brake circuit includes another front wheel brake means and another rear wheel brake means and said second change over valve means is disposed within the rear wheel brake means circuit so that either one of said rear wheel brake means may be selectively controlled.

8. An anti-skid brake control system as set forth in claim 7, wherein the front and rear wheel brake means associated with each brake circuit are located on opposite sides of said vehicle.

9. An anti-skid brake control system as set forth in claim 8, wherein said servo-actuator if said pressure reducing means includes a sensing switch which senses the operational condition of said servo-actuator and generates a signal in response thereto, said signal being transmitted to said computer means as a further output signal.

10. An anti-skid brake control system as set forth in claim 9, wherein said computer means comprises a plurality of logic elements and upon receipt of said three output signals from said first and second sensing means and said sensing switch produces signals to said first and second change over valves and said servo-actuator so that the pressure in one of said rear wheel brake means may be controlled.

11. An anti-skid brake control system as set forth in claim 3, including a pedal switch means associated with said master cylinder supplying a signal to said computer indicating actuation of said master cylinder in order to prevent operation of said pressure reducing means when said vehicle is not under a braking condition.

12. The pressure reducing means of claim 3 wherein said servo-actuator is comprised of a power piston disposed between two servo chambers, one of which is continually exposed to a low pressure air supply, the other of which is controllably exposed to said low pressure air supply and said atmospheric air pressure such that when said latter chamber is exposed to atmospheric air pressure the pressure differential across said power piston is sufficient to move said power piston away from said latter chamber and toward said former chamber, a piston biasing means to bias said power piston towards said latter higher pressure chamber, said power piston in physical contact with a pressure reducing piston slidably mounted in said pressure reducing chamber such that when said pressure reducing means is controllably operated said pressure differential between said servo chambers is sufficient to move said power piston against said biasing spring allowing said pressure reducing piston to move out of said pressure reducing chamber reducing the pressure in said wheel brake means.

13. An anti-skid brake control system as in claim 3 wherein said change over valve means is comprised of an electromagnetic solenoid having two positions, being biased in said first position by a spring biasing means and operable when energized electrically to said second position and ball valve means, said solenoid being operatively connected to said ball valve means, said change over valve means being connected between said master cylinder, said wheel brake means and said pressure reducing means, such that in said first position of said solenoid fluid communication is between said master cylinder and said wheel brake means, and in said second position communication is between said fluid brake means and said pressure reducing means.

14. An anti-skid brake control system for a vehicle, comprising:
- a master cylinder for supplying fluid under operator-controlled pressure to a fluid brake circuit having a plurality of wheels;
- said fluid brake circuit connected to the outlet of said master cylinder and having at least two wheel brake means and corresponding wheels;
- first and second change over valve means interposed between said outlet of master cylinder and each of said wheel brake means, respectively, and each change over valve means being operable for controlling the fluid communication therebetween;
- a single pressure reducing means including a single pressure reducing chamber connected to said first and second change over valve means, a single pressure reducing piston slidably disposed within said pressure reducing chamber for increasing and decreasing the capacity thereof, and a single servo actuator for actuating said reducing piston;
- first and second sensing means for sensing rotational conditions of wheels associated with said wheel brake means of said brake circuit respectively, each sensing means generating an output signal in response to the rotational condition of the corresponding wheel of said wheel brake means; and
- a computer means electrically connected to said first and second change over valve means, and to said servo motor of said pressure reducing means, said computer means generating and transmitting first, second, and third signals to said first and second change over valve means and said servo motor, respectively, upon receipt of said output signal from said first and second sensing means.

* * * * *